United States Patent [19]

Staveley

[11] Patent Number: 5,000,544

[45] Date of Patent: Mar. 19, 1991

[54] HELMET SYSTEM WITH OPTICAL DISPLAY PROJECTION SYSTEM INCLUDING A CYLINDRICAL REFRACTIVE SURFACE

[75] Inventor: Christopher B. Staveley, Chatham, England

[73] Assignee: GEC-Marconi Limited, England

[21] Appl. No.: 469,558

[22] PCT Filed: Jul. 31, 1989

[86] PCT No.: PCT/GB89/00874

§ 371 Date: Mar. 27, 1990

§ 102(e) Date: Mar. 27, 1990

[87] PCT Pub. No.: WO90/01717

PCT Pub. Date: Feb. 22, 1990

[30] Foreign Application Priority Data

Aug. 1, 1988 [GB] United Kingdom ............... 8818246

[51] Int. Cl.$^5$ ............................................. G02B 27/10
[52] U.S. Cl. ..................................... 350/174; 350/433
[58] Field of Search ............... 350/174, 433, 445, 638, 350/618, 619, 620

[56] References Cited

U.S. PATENT DOCUMENTS 4,081,209 3/1978 Heller et al. ...................... 350/174

Primary Examiner—Jon W. Henry
Attorney, Agent, or Firm—Kirschstein, Ottinger, Israel & Schiffmiller

[57] ABSTRACT

A helmet system including a head-up display system wherein the combiner comprises a tuned optical coating (17) carried on the inner surface of a transparent vizor (15) provided on the helmet (13), and light from the display source (27) is directed onto the combiner, for reflection to the helmet wearer's eyes (29), after passing through a body of light refractive material material (25). Light from the display source passes into the body via a cylindrical surface (33), is reflected within the body at a planar surface (35) and exits the body via a convex surface (37). The system provides a high quality collimated display with minimal change of the physical size and aerodynamic performance of the helmet and vizor so as to provide improved fast jet ejection capability.

5 Claims, 2 Drawing Sheets

HELMET SYSTEM WITH OPTICAL DISPLAY PROJECTION SYSTEM INCLUDING A CYLINDRICAL REFRACTIVE SURFACE

BACKGROUND OF THE INVENTION

1. Field of the Invention

This invention relates to helmet systems.

More particularly the invention relates to helmet systems incorporating a display system mounted on the helmet.

2. Description of Related Art

A helmet mounted display system is an arrangement by which a helmet wearer can simultaneously view an outside world scene and a scene produced by a display device, an image of the display device scene being viewed by the helmet wearer superimposed upon his view of the outside world scene through a combiner element. The system is generally so designed such that the helmet wearer can be attentive to both outside world and display device scenes without having to alter his line of sight or refocus his eyes.

The drawback of many previous helmet mounted display systems has been the fact that the implementation of the display system into the helmet system has caused undesirable changes to the helmet system in terms of additional weight, increased physical size, increased cost and complexity of manufacture, significant degradation of the outside world scene and, particular to the common use in helmets worn by pilots of fighter jets, the increased inertia effects of high G upon the helmet system, particularly when subject to windblast under ejection when degradation of aerodynamic performance of the helmet system is also a major drawback.

UK Patent No. 1,533,859 discloses a helmet mounted display system containing several of the above drawbacks. In that system physical space constraints demanded the use of a light refracting and reflecting insert in the helmet visor as the combiner element employed to couple the display device scene with the outside world scene. One undesirable effect of this particular approach is that of outside world scene degradation where discontinuities of the view at the edges of the insert would be apparent. Further the integrity of such a helmet mounted display system in terms of safety is questionable, particularly during the act of ejecting from a fast jet whilst wearing such a helmet display system. Windblast on the unusually shaped visor calls for a strength of the visor and insert combination equal to that of the original visor approved for use in such conditions. This requires large increases in the complexity and, therefore, cost of manufacture of the new visor.

Other design schemes for helmet mounted display systems have avoided the problems associated with using an insert in the helmet visor by depositing a patch of dichroic material onto a specific inner surface area of the visor and using this patch as the combiner element for the mixing of the scenes. However, such an approach does not give the flexibility gained from using an insert in the visor, where the angle and curvature of the reflecting surface can be tailored to suit the needs of the system. An effect of this has been the need to change the position and/or angle of the visor such that the required directional effect of the reflection is achievable; these changes being either a forward movement of the visor away from the helmet wearer's face or both. Both of these changes serve to move the centre of gravity of the visor structure away from the face and so increase the forward moment of the helmet system about its fulcrum which is the helmet wearer's neck, and this calls for counterbalancing at the rear of the helmet when considering high G applications, thus increasing the overall weight of the helmet display system. The forward shift of the visor also causes aerodynamic degration especially under ejection windblast which calls for the need to bridge the clearance created between the new visor position and the helmet shell with a rigid structure so further increasing the forward moment and weight of the system.

SUMMARY OF THE INVENTION

It is an object of the present invention to provide a helmet system incorporating a display system mounted on the helmet wherein these problems are alleviated.

According to the present invention there is provided a helmet system comprising: a helmet having a helmet shell part and a transparent visor part provided with a coating possessing both light transmissive and light reflective properties over a localised inwardly facing surface thereof, and, secured to the helmet shell part an optical display projection device comprising a body of light refractive material and a display source fixed with respect to said body, the display source being located at the focal plane of the combination comprising said coating and said body so that rays developed at the display source, after reflection within and refraction by said body, are reflected at said coating to an eye position defined by the helmet to provide a virtual image of the display on a line of sight through said coating characterised in that: said coating is a tuned optical coating; said transparent visor part has a smoothly contoured shell-like form; and said body of refractive material has cylindrical, planar and convex surfaces which are positionally so related to each other, to the display source, and to said coating that the rays from said source reflected at said coating to the eye position are incident on said coating after being first refracted into said body at said cylindrical surface, then reflected at said planar surface and finally refracted out of said body at said convex surface.

Preferably the tuned optical coating is a dichroic coating reflective to light in the waveband of the display source and, otherwise, transmissive to light.

Preferably the display source is constituted by a matrix of light emissive diodes.

BRIEF DESCRIPTION OF THE DRAWINGS

One helmet system in accordance with the invention will now be described, by way of example, with reference to the accompanying drawings, in which.

DETAILED DESCRIPTION OF THE PREFERRED EMBODIMENT

Figure 1:
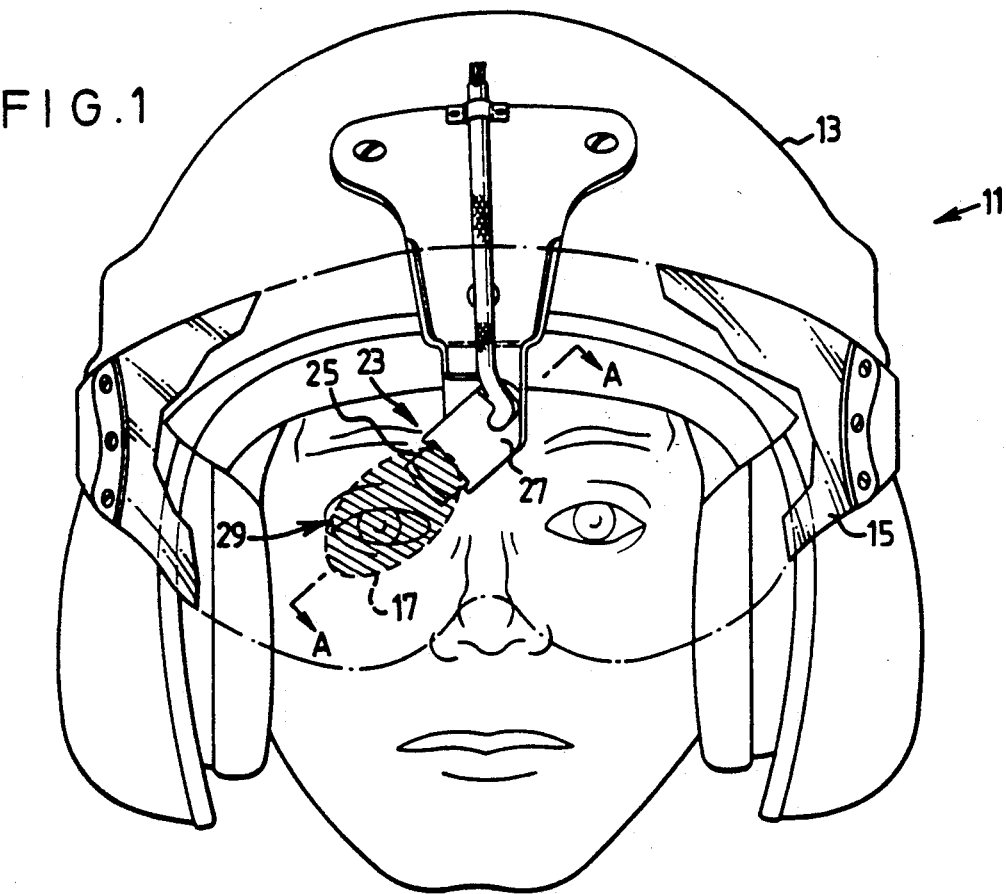
FIG. 1 shows a front view of the system.
Figure 2:
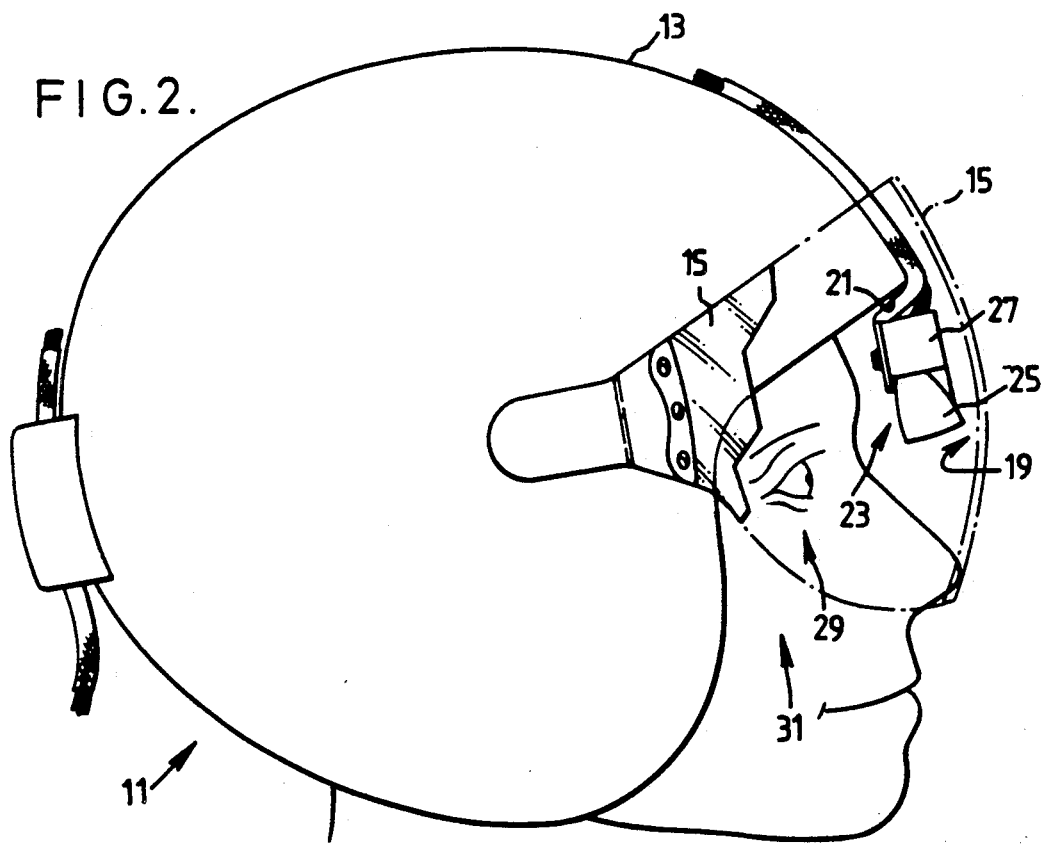
FIG. 2 is a side view of the system.

The helmet system comprises a helmet 11 having a shell part 13 and a transparent visor part 15 provided with a dichroic coating 17 over a localised inwardly facing concave, specifically spherical concave, surface 19 of the visor part 15. Secured to the helmet shell part 13 dependant from the brim 21 thereof there is a bright sight display projection device 23 comprising a body 25 of light refractive material such as glass or polycarbonate, and a bright sight display source 27 fixed with respect to the body 25. The sight display source 27, as in prior helmet systems incorporating helmet mounted display systems such as the arrangement of UK Patent No. 1,533,859, is located at the focal plane of the combination comprising the coating 17 and the body 25 so that a virtual image 'at infinity' of the bright sight display source 27 appears in the line of sight from an eye position 29 through the coating 17.

The display projection device 23 is supported substantially centrally of the face aperture 31 of the helmet shell 13 dependant therefrom at a location between the visor part 15 and the helmet wearer's brow above the level of the eye positions 29 of the wearer.

In distinction from known prior arrangements the body 25 of light refractive material has as essential characteristics a cylindrical surface 33 at one end, a spherical convex surface 37 at the opposite end and, extending between the opposite ends, a planar surface 35 having a mirror coating thereon.

The bright sight display source 27 is constituted by a matrix of light emissive diodes (LEDs).

Figure 3:
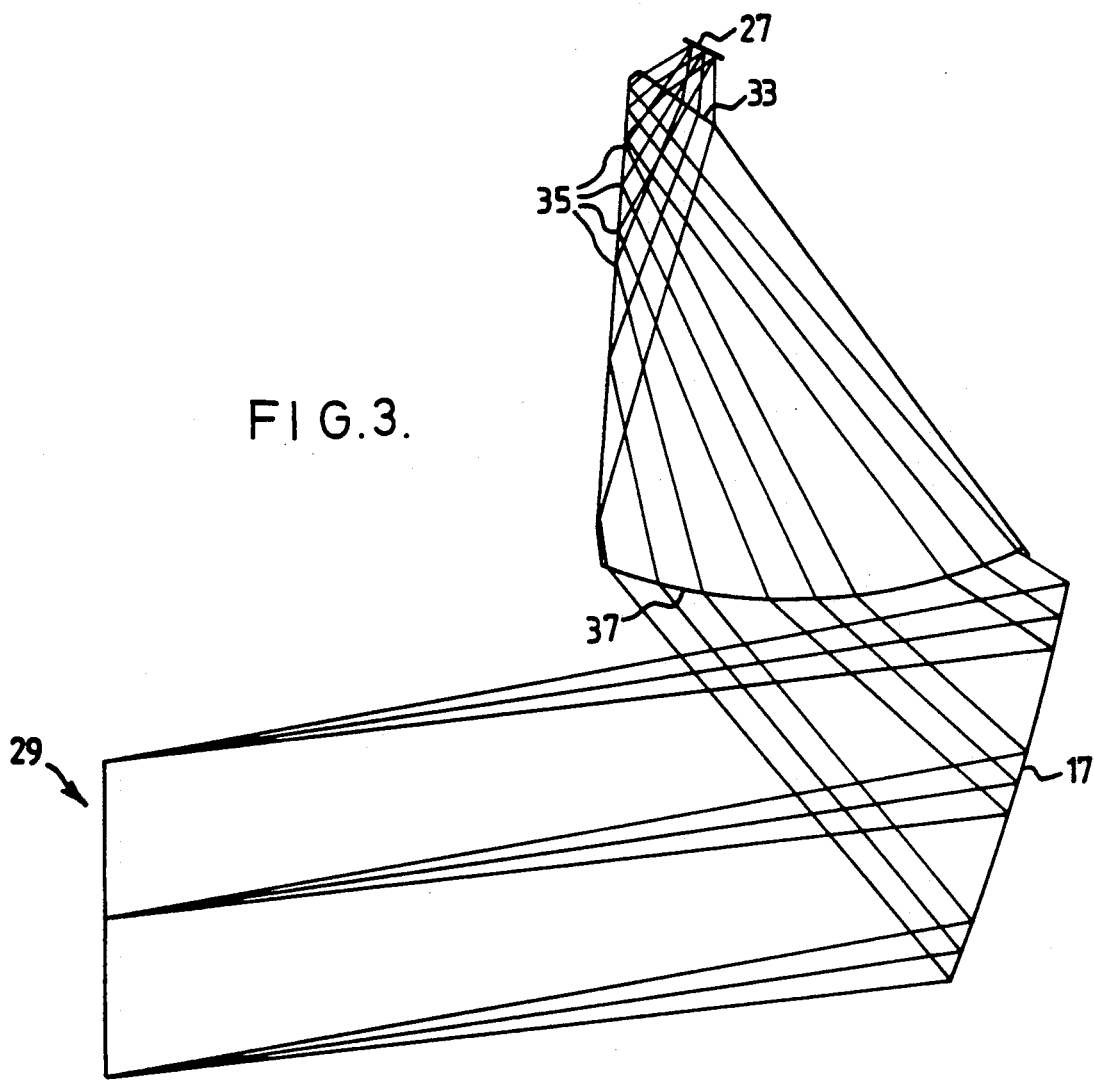
FIG. 3 is a ray trace in a tangential plane A—A through a display system of the helmet system.
Figure 4:
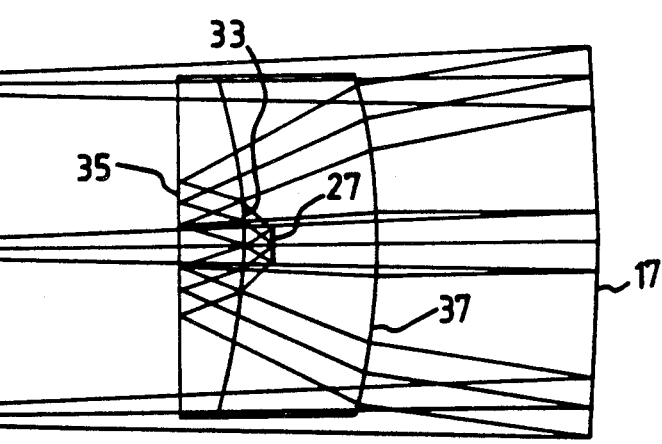
FIG. 4 is a sagittal ray trace through the display system.

Referring to FIGS. 3 and 4 rays from the LED matrix 27 incident on the cylindrical surface 33 of the body 25 are refracted into the body 25. Rays so refracted and incident on the planar mirror surface 35 are reflected thereat. Rays reflected at the planar surface 35 to the spherical convex surface 37 are refracted out of the body 25 towards the dichroic coating 17. The configuration of the several elements is such that rays reflected at the dichroic coating 17 are directed, collimated, to the position 29 of one of the eyes of the wearer, the whole arrangement of the helmet shell visor and the optical elements thus being such that the wearer is presented with a collimated virtual image of the bright sight display produced by the LED matrix.

The helmet mounted display system described and depicted performs the task of presenting to the helmet wearer a high quality collimated sighting display combined with the outside world scene whilst requiring minimal additional weight to be added to the helmet system, and minimal change to the physical size and aerodynamic performance of the helmet and visor system. Such a system presents an improved fast jet ejection capability without undermining the safety of the helmet wearer, and whilst being of minimal complexity for such a device.

I claim:

1. A helmet system comprising a helmet having a helmet shell part and a transparent visor part provided with a coating possessing both light transmissive and light reflective properties over a localised inwardly facing surface thereof, and, secured to the helmet shell part an optical display projection device comprising a body of light refractive material and a display source fixed with respect to said body, the display source being located at the focal plane of the combination comprising said coating and said body so that rays developed at the display source, after reflection within and refraction by said body, are reflected at said coating to an eye position defined by the helmet to provide a virtual image of the display on a line of sight through said coating characterised in that: said coating is a tuned optical coating; said transparent visor part has a smoothly contoured shell-like form; and said body of refractive material has cylindrical, planar and convex surfaces which are positionally so related to each other, to the display source, and to said coating that the rays from said source reflected at said coating to the eye position are incident on said coating after being first refracted into said body at said cylindrical surface, then reflected at said planar surface and finally refracted out of said body at said convex surface.

2. A helmet system according to claim 1 wherein said coating is a dichroic coating reflective to light in the waveband of the display source and, otherwise, transmissive to light.

3. A helmet system according to claim 1 wherein said cylindrical and convex surfaces are at opposite ends of said body of refractive material and said planar surface extends between said opposite ends.

4. A helmet system according to claim 1 wherein the display projection device is dependent from the helmet shell part at a location between the visor part and the head of a wearer of the helmet above the level of and between the eyes of the wearer.

5. A helmet system according to any one of the preceding claims wherein said display source comprises a matrix of light emitting diodes.

* * * * *